United States Patent [19]

Hoster et al.

[11] Patent Number: 4,786,321

[45] Date of Patent: Nov. 22, 1988

[54] METHOD AND APPARATUS FOR THE CONTINUOUS MELTING OF SCRAP

[75] Inventors: Thomas Hoster; Dieter Neuschütz, both of Essen; Wolf-Dieter Röpke, Wilnsdorf-Obersdorf, all of Fed. Rep. of Germany

[73] Assignee: Fried. Krupp Gesellschaft Mit Beschränkter Haftung, Essen, Fed. Rep. of Germany

[21] Appl. No.: 28,594

[22] Filed: Mar. 13, 1987

[30] Foreign Application Priority Data

Mar. 15, 1986 [DE] Fed. Rep. of Germany ....... 3608802

[51] Int. Cl.⁴ ............................................. C21C 1/00
[52] U.S. Cl. ....................................... 75/43; 266/215
[58] Field of Search ..................... 75/43, 445; 266/215

[56] References Cited

U.S. PATENT DOCUMENTS

| | | | |
|---|---|---|---|
| 3,313,618 | 4/1967 | Feinman | 75/43 |
| 3,902,889 | 9/1975 | Malin | 75/445 |
| 4,025,059 | 5/1977 | Steinmetz et al. | 266/215 |
| 4,347,079 | 8/1982 | Wells | 75/52 |

OTHER PUBLICATIONS

M. W. Thring, "The Next Generation in Steelmaking-II", Feb. 1969, pp. 35–40.
Ralph Weber, "Current State of the E.O.F. Steelmaking Process", pp. 64 and 65.
Goro Yuasa et al., "Steelmaking without Electric Power with Carbonaceous Material and Oxygen", Transactions ISIJ, vol. 25, 1985, H.1, S. 3–6.

*Primary Examiner*—Peter D. Rosenberg
*Attorney, Agent, or Firm*—Spencer & Frank

[57] ABSTRACT

A method and apparatus for the continuous melting of an iron-containing material in a melting device, the melting device being composed of a vertical shaft having a central axis, a melting furnace disposed below, and communicating with, the shaft, the melting furnace being asymmetrical to the central axis and being formed to have a region which is furthest removed from the central axis, at least one first nozzle opening into the furnace, located in the vicinity of the furnace bottom in the region furthest removed from the central axis, and at least two second nozzles opening into the furnace and located above the furnace bottom. Melting is effected by: introducing iron-containing material into the shaft for causing the material to descend through the shaft; supplying carbon carrier and oxygen to the nozzles for effecting partial combustion of the carbon carrier in the furnace to generate heat which is supplied to the material to form a bath of molten material in the furnace and to generate partially combusted exhaust gas; effecting a selected distribution of the carbon carrier and oxygen to the nozzles for causing the combustion arising from the first nozzle to supply superheating heat below the surface of the bath and the combustion arising from the second nozzles to supply heat for melting material located above the surface of the bath; and effecting post combustion of the partially combusted exhaust gas in the shaft for preheating material in the shaft.

20 Claims, 3 Drawing Sheets

4,786,321

METHOD AND APPARATUS FOR THE CONTINUOUS MELTING OF SCRAP

BACKGROUND OF THE INVENTION

The present invention relates to a method and apparatus for melting scrap in which the melting heat is generated by the partial combustion of coal dust and coke dust together with oxygen in a melting chamber and the remaining energy of the gas generated by the partial combustion is used to preheat the scrap to the extent that separate utilization of the remaining gas is not required. The melting unit is composed of a vertical shaft for preheating the scrap and a melting chamber disposed therebelow.

Methods for melting scrap in which carbon carriers are used to generate the melting heat are known. For example, it has been proposed to melt scrap in cupola furnaces as they are used in the form of blast furnaces for the production of cast iron. In such furnaces, the metal material is melted with the addition of slag forming additives (limestone) and metallurgical coke as the energy carrier. The combustion air, or "wind" is compressed by a blower and blown through nozzles into the furnace shaft through nozzles. A distinction is made between "cold wind" and "hot wind" operation, depending on whether the combustion air is introduced cold or preheated.

The melting process takes place as follows: charges introduced through charge openings fill the furnace shaft approximately to the level of a charging platform. Ascending hot furnace gases heat the charge, which gradually slides down into the furnace shaft as it melts. After reaching the melt zone (300 to 400 mm above the nozzles), the iron begins to flow and drops through a bed of coke, i.e. into a column of filled-in coke which supports the charge and which extends from the bottom to the melt zone. This causes the iron to be highly carbonated.

New developments are the "cupola furnace without lining" in which the shaft is composed of a water-sprinkled metal body without refractory lining and the "cupola furnace without coke" which is selectively operated with gas or oil. Instead of the supporting coke frame, the furnace has a water-cooled grate and a structure of refractory balls above it. Additionally, there are cold wind cupola furnaces with secondary wind operation in which air is blown into the furnace shaft to partially post-combust combustible gas components. In these cases, partial back reactions of the developing carbon dioxide with the coke to form carbon monoxide (Boudouard reaction) cannot be prevented.

It has also been proposed to melt scrap by using a hearth furnace having water cooled wall elements as the refining vessel. In this process, which is called the EOF process, oxygen is blown through nozzles disposed on the side of a hearth furnace below the surface of the bath, and oil and/or coal dust and oxygen are blown through nozzles disposed in the sides above the bath surface. Enriched hot wind is introduced through blow molds disposed above the oil/coal dust/oxygen burners and the exhaust gas is completely post-combusted in the furnace vessel. The hot furnace exhaust gases are conducted through a scrap preheating system disposed above the furnace and are then fed into a recuperator to preheat the blown air. The scrap is preheated to a maximum of 800° C. and is fed into the hearth furnace in discontinuous charges.

The drawbacks of this method are the complicated mechanical structure of the high temperature scrap preheater and the discontinuous manner of charging. The exhaust gas temperatures in this process fluctuate over time and thus make further utilization of the exhaust gas heat more difficult.

To increase the melting output of steel mill converters, methods have recently been developed in which coal dust and oxygen are blown into the metal bath through special nozzles disposed in the bottom of the converter. The heat released during the partial combustion of the carbon to carbon monoxide is utilized to melt scrap or sponge iron. Examples for such methods are the so-called COIN process and the KMS method. In the KMS method, oxygen is additionally blown onto the bath surface and the exhaust gas is partially post-combusted.

A significant drawback of these processes is the poor gas utilization. For the economical operation of such systems, secondary utilization of the exhaust gases is absolutely necessary.

SUMMARY OF THE INVENTION

It is an object of the present invention to provide a method which avoids the drawbacks of the prior art methods, in which the dust-like carbon carrier is utilized for melting and the latent and specific heat of the resulting exhaust gas can be utilized by way of post-combustion.

The above and other objects are achieved, according to the invention, by a method and apparatus for the continuous melting of an iron-containing material which is at least one of scrap and sponge iron in a melting device, the melting device being composed of a vertical shaft having a central axis, a melting furnace disposed below, and communicating with, the shaft, the melting furnace having a bottom, being asymmetrical to the central axis and being formed to have a region which is furthest removed from the central axis, at least one first nozzle opening into the furnace, located in the vicinity of the furnace bottom in the region furthest removed from the central axis, and at least two second nozzles opening into the furnace and located at a selected level above the furnace bottom, melting being effected by:

introducing iron-containing material into the shaft for causing the material to descend through the shaft; and heating the material which has been introduced into the shaft for melting the material to form a bath of molten material in the melting furnace, which bath has an upper surface located below the selected level;

wherein the step of heating comprises: supplying carbon carrier and oxygen to the first and second nozzles for effecting partial combustion of the carbon carrier in the furnace to generate heat which is supplied to the material and to generate partially combusted exhaust gas; effecting a selected distribution of the carbon carrier and oxygen to the first and second nozzles for causing the combustion arising from the first nozzle to supply superheating heat below the upper surface of the bath and the combustion arising from the second nozzles to supply heat for melting material located above the upper surface of the bath; and effecting post combustion of the partially combusted exhaust gas in the shaft for preheating material in the shaft.

In the method according to the invention, coal dust and/or oxygen are blown in through one or a plurality of nozzles underneath the metal bath in the hearth of a shaft furnace, with the hearth axis preferably being offset from the furnace axis. In addition, one or a plurality of coal dust/oxygen nozzles are provided above the bath surface. The heat released in the melt and in the gas chamber from the partial combustion of the carbon is utilized to continuously melt the scrap. The carbon dust component and the oxygen component of each nozzle are here so dimensioned that the heat to melt the scrap is introduced substantially through the nozzles disposed above the bath surface and the superheating heat is introduced through the nozzles disposed below the bath surface.

By varying the ratio of coal dust to oxygen in the below-the-bath nozzles, any desired carbon content can be set in the melt. The process is operated in such a manner that the ascending gases preheat the scrap as it drops down through the furnace shaft into the hearth. Preferably, one or more ring nozzles are attached above the coal dust/oxygen nozzles, which are disposed above the bath, for blowing air and/or oxygen into the stream of gas. This causes the combustible gas components to be almost completely post-combusted and thus the latent heat of the exhaust gas to be utilized almost completely.

The post-combusted, cooled gas is advisably collected in a ring conduit, or manifold, and decontaminated. The residual heat obtained can be utilized to preheat the air or the oxygen at the locations where the post-combustion takes place.

In a preferred embodiment of the invention, the hearth furnace has a cross section which is asymmetrical to the furnace axis. At the point where the coal dust/oxygen nozzle disposed below the metal bath enters into the hearth chamber, the furnace wall noticeably bulges out. This prevents damage to the nozzle from descending pieces of scrap. The scrap column here rests directly on the hearth floor.

Advantageously, the hearth furnace is equipped with an inclined bottom. The lowest point of the bottom is here disposed in the plane of the coal dust/oxygen nozzle. Advisably, the bottom ascends toward the side of the furnace which is opposite the coal dust/oxygen nozzle. The slope is about 45°. This arrangement assures that the liquid metal always collects in front of the coal dust/oxygen nozzle, and thus the melt continuously flows around the nozzle. This prevents excess nozzle wear. Moreover, the bath temperature is always high enough in this region, because of the direct introduction of heat, so that a proper tap-off is possible through a siphon disposed in the immediate vicinity.

The siphon plane may be offset by 45° with respect to the nozzle plane. This arrangement has the advantage that the region of the metal and slag discharge points cannot be damaged by a directly impinging flame but that, at the same time, the temperature of the tapped metal is sufficiently high for fault free operation.

In the region of the metal bath, the hearth furnace is lined with magnesite or chromium magnesite rocks. In the slag zone, the furnace wall is preferably made of a material behind which are disposed water cooled elements so that the formation of deposits is provoked there to protect the lining.

The post-combustion chamber is preferably constituted of water-cooled walls.

Compared to the prior art, the present invention offers the advantage that the use of 100% scrap is possible. Moreover, it is possible to set any desired carbon content in the bath. Constant exhaust gas temperatures can also be maintained. Finally, no mechanical components are disposed in the high temperature zones and it is possible to continuously charge the scrap and continuously withdraw metal and slag. Excess gas utilization is not required.

In special cases, the nozzles provided above the bath surface to blow in the carbon carrier and the oxygen can also be replaced by plasma burners. This has the special advantage that an inert atmosphere is created above the bath surface which has an advantageous effect on the quality of the resulting melt. The plasma burners are preferably operated with alternating or three-phase current.

DESCRIPTION OF THE PREFERRED EMBODIMENTS

Figure 1:
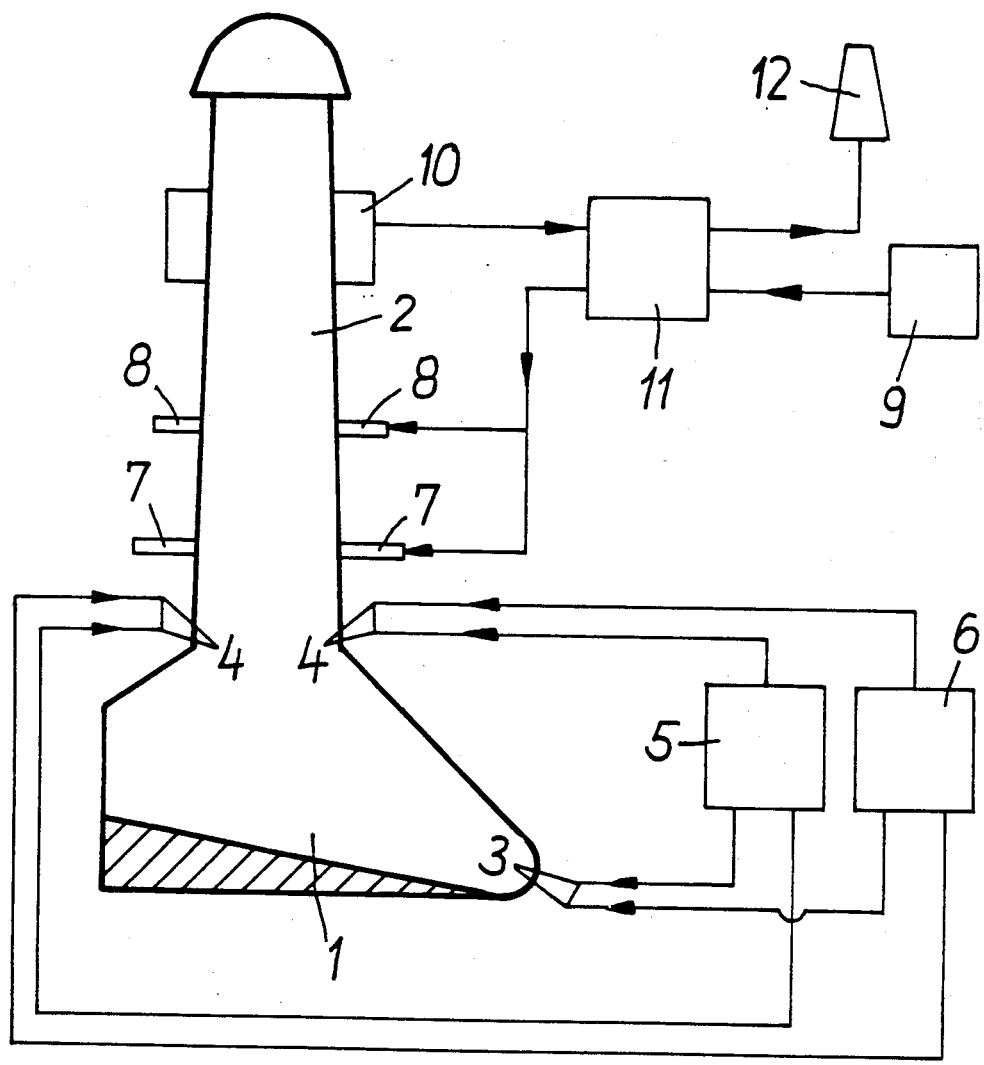
FIG. 1 is a partly pictorial and partly schematic view of an apparatus for implementing the method according to the invention.
Figure 2A:
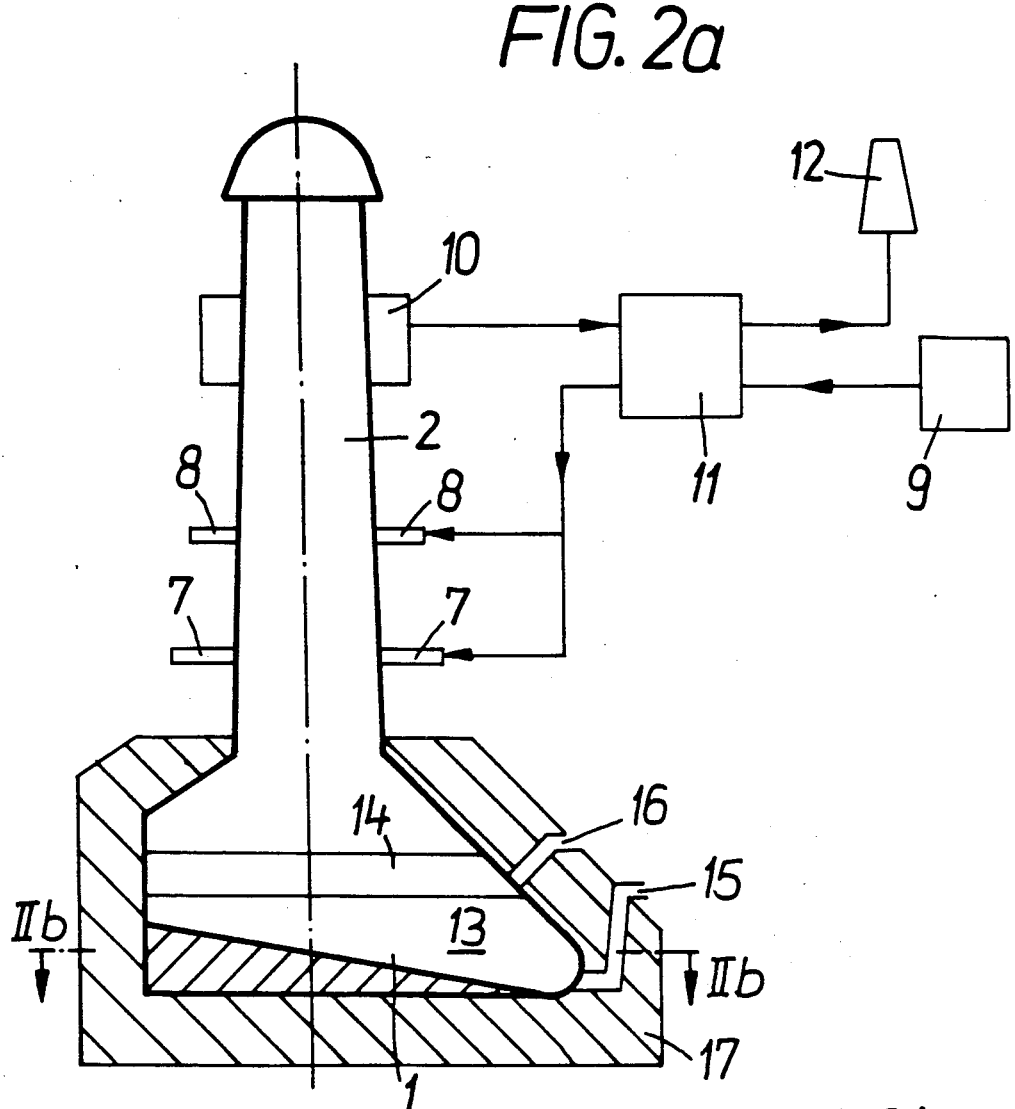
FIG. 2a is a sectional view taken on line IIb—IIb of FIG. 2.
Figure 2B:
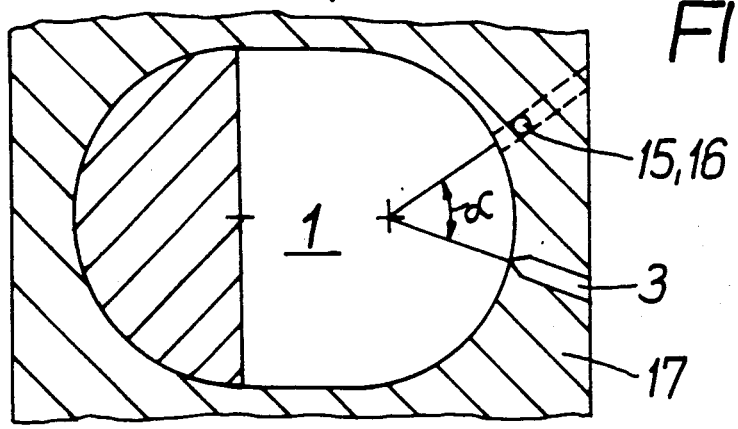
FIG. 2 is a sectional view showing various details of the apparatus of FIG. 1.

Above a melting furnace, or hearth, 1 having a capacity of, e.g., about 10 tons of metal, there is disposed a shaft 2 of a cold/hot blast cupola furnace without lining, which is operated without coke and without grate. Melting furnace has an asymmetrical form and a maximum bottom diameter of 2000 mm.

The basic shape of the furnace hearth is oval. The dispositions of the axis of shaft 2, nozzle 3 and siphons 15 and 16 are represented in drawing 2 b.

With reference to the center axis of shaft 2, the distance between to the wall of furnace 1 varies about 750 mm on one side and about 1250 mm on the other side.

At the transition between furnace 1 and cylindrical shaft 2, furnace 1 has a diameter of 1000 mm. Melting furnace 1 is 2000 mm high. The furnace floor is inclined by about 45°, with the slope being arranged in such a manner that the lowest point of the floor coincides with the point in the furnace wall which is farthest removed from the center axis of shaft 2. Furnace 1 has a steel jacket which is water cooled in the region of the slag zone and above the slag plane. Floor and furnace walls are lined with magnesite or chromium magnesite rocks, and the lining ends above the slag plane.

At the lowest point in the furnace bottom, there is at least one coal dust/oxygen nozzle 3. Two coal dust nozzles 4 are disposed above the slag plane at the point of transition from the hearth furnace to the shaft of the cupola furnace. All nozzles are supplied through pipelines with coal dust from a coal bunker 5 and with oxygen from an oxygen tank 6.

Slag and metal are removed continuously through a slag and metal siphon. The plane of the siphon is offset by 45° with respect to the coal dust/oxygen nozzles disposed below the bath in the bulging portion of the hearth.

The diameter of the cupola furnace shaft 2 is 1000 mm. The useful height to the ring conduit is about 3900 mm. In the region of shaft 2, two ring nozzles 7 and 8 are provided at a mutual vertical spacing of 1000 mm. Through pipelines they are supplied with air coming from a reservoir vessel 9 or with oxygen from oxygen tank 6. The exhaust gases of the cupola furnace are collected in ring conduit 10, fed to a heat exchanger 11 and then decontaminated through a chimney 12. The bottom of ring conduit 10 is about 3900 mm above the bottom of shaft 2. The residual heat of the heat exchanger can be utilized to preheat the post-combustion air coming from vessel 9, as shown, or the oxygen supplied by tank 6 to nozzles 7 and 8. The air or oxygen supplied to nozzles 7 and 8 is delivered into shaft 2 to effect post-combustion of the exhaust gas in shaft 2.

The above-described arrangement has been used to melt steel scrap having a composition of, for example, 0.3% C, 0.2% Si, 0.4% Mn, 0.03% P, 0.04% S, remainder Fe.

If coal of average volatility is used, which contains 10% ash, 9% volatile substances and 80% $C_{fix}$, $C_{fix}$ being the content of elemental carbon in the coal which is enriched with oxygen during combustion, the following consumption and output values result as a function of the exhaust gas conditions:

| | |
|---|---|
| CO content in the exhaust gas, volume % | 5 |
| temperature of the exhaust gas, °C. | 300 |
| coal, kg/h | 720 |
| oxygen, Nm³/h | 538 |
| secondary wind, Nm³ air/h (without enrichment)* | 2583 |
| melting output, t/h | 9.8 |
| quantity of exhaust gas, m³/h | 3457 |

*amount of wind at an oxygen content in the wind of 21%.

If an enriched wind with a higher oxygen content is used, the amount of wind required diminishes correspondingly. The amount of wind is determined by the oxygen requirement for post-combustion.

The coal dust is fed from a bin 5 shown in FIG. 1 to the individual nozzles by pneumatic conveying, preferably of the energy-saving, low-wear dense-flow type. Both the conveying systems and the splitting of the coal dust flow into various streams are state of the art and are used in many blast furnaces around the globe. An example of such a conveying system including the splitting of the coal flow into several streams is given in "Neue Hütte, Vol. 28, 1983, No. 12, pp. 441-44".

The energy required to heat the melt to the desired tap-off temperature is introduced through nozzle 3 disposed below the bath surface. This temperature is usually 50-100K higher than the liquidus temperature of the melt. The ratio of coal to oxygen blown in determines the end carbon content of the melt. For example, the carbon content of the bath remains unchanged vis-a-vis the carbon content of the scrap if at the above carbon composition oxygen is introduced at the rate of 0.751 m³ NTP O₂/kg coal. This is the amount of oxygen which is necessary in order to oxidize the carbon content of the coal to give carbon monoxide. A reduction in the oxygen supply compared with the above figure leads to carburization of the bath while an increase causes decarburization. The preferred end carbon content of the bath lies between 1 and 2.5%.

The metal bath 13 and the slag 14 are tapped off, preferably continuously, via the metal siphon 15 leading through the lining 17 and via the slag siphon 16, respectively. The siphons 15 and 16 are disposed in hearth 1 such that they are offset from nozzle 3 by the angle α.

The angle α is preferably 10° to 90°. Slag and metal tap-off is state of the art in cupola furnaces. A summary is given in: W. Ruff, W. Voges: Die Kupolofensysteme und Anlagen zur Verbesserung des thermischen Wirkungsgrades, Fachberichte Hüttenpraxis Metallweiterverarbeitung, Vol. 23, No. 7, 1985, pp. 507-520.

Figure 3:
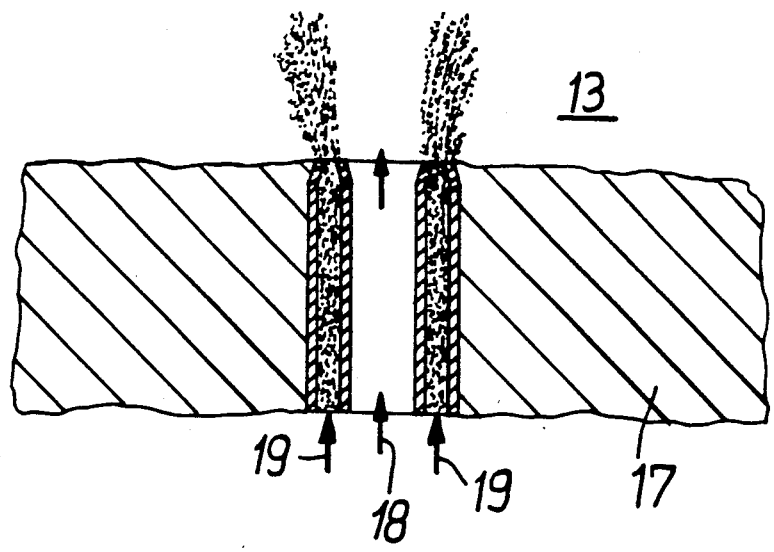
FIG. 3 illustrates the details of a nozzle used in the apparatus of FIG. 1.

The design of coin nozzle 3 located beneath the surface of the bath is shown in FIG. 3. The design is such that the coal stream 19 envelops the central oxygen stream 18. The advantage of this arrangement is that the coal stream cools the nozzle. With the COIN nozzle the need for an additional cooling gas (e. g. hydrocarbons) is obviated.

The invention now being fully described, it will be apparent to one of ordinary skill in the art that many changes and modifications can be made thereto without departing from the spirit or scope of the invention as set forth herein.

The present disclosure relates to the subject matter disclosed in German Application No. P 36 08 802.1 of Mar. 15th, 1986, the entire specification of which is incorporated herein by reference.

What is claimed is:

1. A method for the continuous melting of an iron-containing material which is at least one of scrap and sponge iron in a melting device, the melting device being composed of a vertical shaft having a central axis, a melting furnace disposed below, and communicating with, the shaft, the melting furnace having a bottom, being asymmetrical to the central axis and being formed to have a region which is furthest removed from the central axis, at least one first nozzle opening into the furnace, located in the vicinity of the furnace bottom in the region furthest removed from the central axis, and at least two second nozzles opening into the furnace and located at a selected level above the furnace bottom, said method comprising:

introducing iron-containing material into the shaft for causing the material to descend through the shaft; and heating the material which has been introduced into the shaft for melting the material to form a bath of molten material in the melting furnace, which bath has an upper surface located below the selected level;

wherein said step of heating comprises: supplying carbon carrier and oxygen to the first and second nozzles for effecting partial combustion of the carbon carrier in the furnace to generate heat which is supplied to the material and to generate partially combusted exhaust gas; effecting a selected distribution of the carbon carrier and oxygen to the first and second nozzles for causing the combustion arising from the first nozzle to supply superheating heat below the upper surface of the bath and the combustion arising from the second nozzles to supply heat for melting material located above the upper surface of the bath; and effecting post combustion of the partially combusted exhaust gas in the shaft for preheating material in the shaft.

2. Method as defined in claim 1 wherein the carbon carrier is a fine grained coal having a grain size of <5 mm.

3. Method as defined in claim 2 wherein the coal has a grain size of <1 mm.

4. Method as defined in claim 2 wherein the fine grained coal is precarbonized.

5. Method as defined in claim 1 wherein said step of effecting post combustion comprises bringing air into contact with the exhaust gas.

6. Method as defined in claim 5 wherein the air is enriched with oxygen.

7. Method as defined in claim 5 wherein the residual heat from the exhaust gas of the shaft is utilized to preheat the air.

8. Method as defined in claim 1 wherein the carbon carrier is coal dust and further comprising establishing a selected ratio between the coal dust and the oxygen supplied to said first nozzle for imparting a selected carbon content to the molten material.

9. Method as defined in claim 1 wherein the first nozzle is a COIN nozzle.

10. Method as defined in claim 1 wherein post-combustion is effected at at least one selected location in the shaft.

11. Apparatus for the continuous melting of an iron-containing material which is at least one of scrap and sponge iron, comprising:
   a cylindrical vertical shaft having a central axis, for the downward conveyance of material to be melted;
   a melting furnace disposed below, and communicating with, the shaft, said melting furnace having a bottom, being asymmetrical to the central axis and being formed to have a region which is furthest removed from the central axis, said melting furnace defining a chamber for containing a bath of molten material created by the melting of material reaching the bottom of said shaft;
   at least one first nozzle opening into said furnace chamber, and located in the vicinity of the furnace bottom in the region furthest removed from the central axis;
   melting means located above the location of the bath; and
   means connected for feeding selected quantities of a carbon carrier and oxygen to said nozzle for ejection by said nozzle to produce partial combustion of the carbon carrier in said chamber to generate heat which is supplied to the material and to generate partially combusted exhaust gas such that the combustion arising from said nozzle supplies superheating heat into the bath, while said melting means supplies heat for melting material located above the bath, and the partially combusted exhaust gas undergoes post combustion in said shaft for preheating material in said shaft.

12. Apparatus as defined in claim 11 wherein the bottom of said furnace is sloped at an angle of 5° to 45°, with respect to the horizontal, downwardly toward said first nozzle.

13. Apparatus as defined in claim 12 wherein said furnace has a siphoning plane which is offset by 10° to 90°, with respect to said first nozzle.

14. Apparatus as defined in claim 13 wherein the offset of the siphoning plane is 45°.

15. Apparatus as defined in claim 11 wherein said melting means comprises at least two second nozzles connected to receive and eject the carbon carrier and oxygen for effecting partial combustion of the carbon carrier to supply the heat for melting material located above the bath.

16. Apparatus as defined in claim 11 wherein said melting means comprise plasma burners.

17. Apparatus as defined in claim 11, wherein said melting furnace has a horizontal cross-section which is larger than that of said shaft.

18. Apparatus as defined in claim 11 comprising at least one further nozzle connected to said feeding means, in the transitional region between said shaft and said furnace.

19. Apparatus as defined in claim 11, wherein the bottom of said furnace is sloped downwardly toward the discharge opening.

20. Apparatus as defined in claim 11, wherein said melting furnace has a horizontal cross-section which is larger than that of said shaft, wherein the bottom of said furnace is sloped downwardly toward the discharge opening, and wherein there is provided at least one further nozzle, connected to said feeding means, in the transitional region between said shaft and said furnace.

* * * * *